United States Patent [19]

Baserga

[11] 4,088,661

[45] May 9, 1978

[54] CATIONIC 1,4-DIAMINO-ANTHRAQUINONE DYESTUFFS

[75] Inventor: Emilio Baserga, Zurich, Switzerland

[73] Assignee: Sandoz Ltd., Basel, Switzerland

[21] Appl. No.: 640,216

[22] Filed: Dec. 12, 1975

[30] Foreign Application Priority Data

Dec. 20, 1974 Switzerland .................. 17019/74

[51] Int. Cl.$^2$ .............................................. C09B 1/28
[52] U.S. Cl. .................................................. 260/378
[58] Field of Search ....................................... 260/378

[56] References Cited

U.S. PATENT DOCUMENTS 3,823,169  7/1974  Staub .................................. 260/378

Primary Examiner—Paul F. Shaver
Attorney, Agent, or Firm—Gerald D. Sharkin; Richard E. Vila; Thomas C. Doyle

[57] ABSTRACT

Disclosed are cationic 1,4-diaminoanthraquinone dyestuffs, free from sulpho groups and containing a quaternary ammonium or protonized tertiary amino group bound to the 1-amino group through a propylene radical, and a xylyl group bound to the 4-amino group.

12 Claims, No Drawings

CATIONIC 1,4-DIAMINO-ANTHRAQUINONE DYESTUFFS

The invention relates to amino anthraquinones.

The invention provides cationic 1,4-diaminoanthraquinone dyestuffs, free from sulpho groups and containing a quaternary ammonium or protonised tertiary amino group bound to the 1-amino group through a propylene radical, and a xylyl group bound to the 4-amino group.

The anthraquinone nucleus may be further substituted by substituents not deleteriously affecting the dyeing properties of the dyestuffs. Suitable substituents are those conventional in cationic anthraquinone dyestuff chemistry. The anthraquinone nucleus, however, is preferably further unsubstituted.

The preferred compounds provided by the invention are of formula I,

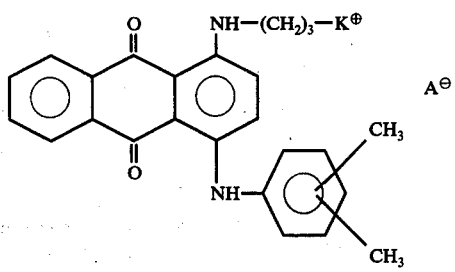

in which $K^\oplus$ is a radical of formula (a) or (b)

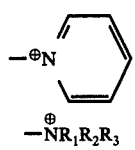

wherein $R_1$ and $R_2$, independently, signify a $C_{1-4}$alkyl radical, and $R_3$ is hydrogen, $C_{1-4}$alkyl, 2-hydroxypropyl or -ethyl, allyl, benzyl or 2-aminocarbonyl-ethyl, and $A^\ominus$ is an anion.

The methyl groups in the xylidino radical are preferably located on the 2- and 5-, or 2- and 4-positions, particularly the latter.

$R_1$ and $R_2$, independently, preferably signify methyl or ethyl, more preferably both being methyl. $R_3$ is preferably $C_{1-4}$alkyl or benzyl, more preferably methyl, ethyl or benzyl, and most preferably methyl.

The exact nature of the anion $A^\ominus$ is not critical provided, of course, it does not deleteriously affect the dyeing properties of the compounds. It is preferably non-chromophoric and is suitably an anion conventional in the cationic dyestuff art. As examples may be given the halide, e.g. chloride or bromide, anions, the sulphate, methylsulphate, ethylsulphate, aminosulphonate, perchlorate, benzenesulphonate, toluenesulphonate, oxalate, maleinate, acetate, propionate, tartrate, malate, methanesulphonate and benzoate anions as well as anions of zinc chloride double salts and of the acids boric, citric, glycolic, diglycolic and adipic.

The compounds provided by the invention may be obtained by (a) reacting a 1-halopropylamino-4-xylidino-anthraquinone with a secondary or tertiary amine or with an aromatic heterocyclic amine, (b) quaternising or protonising a 1-amino-propylamino-4-xylidinoanthraquinone, or (c) reacting an anthraquinone, substituted in the 4-position by a halogen and in the 1-position by a quaternary ammonium or protonised tertiary amino group bearing propylamino group, with a xylidine.

In particular, the invention provides a process for the production of compounds of formula I, stated above, by (ai) reacting a compound of formula II,

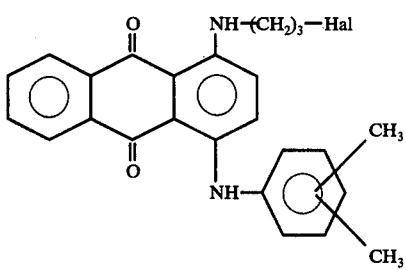

in which Hal signifies a halogen atom with pyridine or an amine of formula $NR_1R_2R_3$, in which $R_1$, $R_2$ and $R_3$ are as defined above, (bi) obtaining a compound of formula I in which $K^\oplus$ is a radical of formula (b), above, by reacting a compound of formula III,

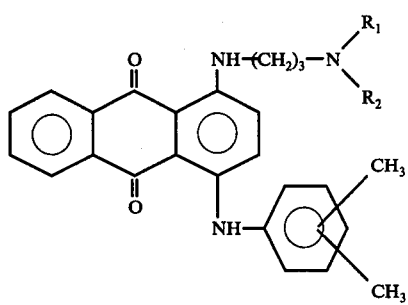

with an $R_3^\oplus$ and $A^\ominus$ liberating agent, (bii) obtaining a compound of formula I, in which $K^\oplus$ is a radical of formula (b), above, in which $R_3$ is other than hydrogen, by reacting a compound of formula IV

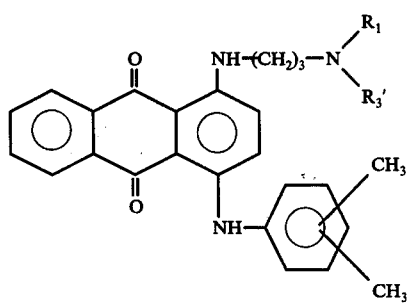

in which $R_3'$ has a significance of $R_3$, above, other than hydrogen, with a compound $R_2A$ in which A is a radical convertible into $A^\ominus$, or (ci) reacting a compound of formula V,

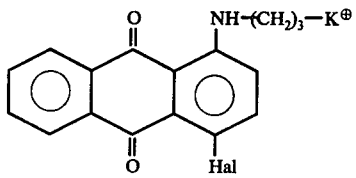

with a xylidine.

The above processes may be carried out in conventional manner.

Thus, processes (a) and (ai) are suitably carried out in water, in an inert organic solvent or in a mixture of water and such a solvent. A suitable reaction temperature is from −50° to +250° C, preferably from −10° to +120° C.

Processes (b), (bi) and (bii) are suitably carried out under conventional quaternisation or protonisation reaction conditions, quaternisation suitably being carried out in an inert solvent, in an aqueous suspension or in an excess of the quaternisation agent, optionally at elevated temperatures and in buffered medium. In process bi), where it is desired to introduce as $R_3$ a 2-hydroxypropyl or -ethyl group, the $R_3^{\oplus}$ and $A^{\ominus}$ generating agent is suitably propylene or ethylene oxide in the presence of an acid HA; where a 2-aminocarbonylethyl group is desired to be introduced a suitable generating agent is acrylamide in the presence of an acid HA. For alkyl, allyl and benzyl significances of $R_3$, suitable agents are compounds $R_3A$, especially alkyl halides such as methyl or ethyl chloride, bromide or iodide, dialkyl sulphates such as dimethyl or diethyl sulphate, and allyl and benzyl chlorides, the above alkyl halides and dialkyl sulphate being particularly suitable $R_2A$ compounds for use in process bii), dimethyl sulphate being particularly preferred. For the protonisation reactions such as process bi) where $R_3^{\oplus}$ is $H^{\oplus}$, such are suitably carried out at from room temperature to 60° C in weak or strongly acid media. Suitable acids as $R_3^{\oplus}$ $An^{\ominus}$ liberating agents are acetic acid, sulphuric acid and hydrochloric acid.

Processes (c) and (ci) are suitably carried out in an inert organic solvent, e.g. an alcholic solvent such as butanol, or in a mixture of water and such a solvent. Suitable reaction temperatures are from 80° to 150° C, preferably from 90° to 110° C. The reaction is advantageously carried out in the presence of an acetate, such as potassium, sodium or ammonium acetate and/or a copper salt.

As will be appreciated, where a compound of the invention is obtained having a particular anion $A^{\ominus}$ and it is desired to exchange such for a different anion, interconversion may be carried out in conventional manner, e.g. using ion exchange techniques.

The resulting compounds of the invention may be isolated and purified in conventional manner.

The starting materials employed in the above processes for the production of the compounds of the invention are either known or may be obtained from available starting materials in conventional manner.

The compounds of the invention are useful for the dyeing and printing of substrates dyeable with basic dyes, such as comprising homo- or mixed polymers of acrylonitrile or of assymetrical dicyanoethylene, of synthetic polyamides or polyesters modified by the introduction of acid groups, as well as paper and leather substrates. The above polymeric substrates are suitably in fibre, filament or fabric form. The dyeing or printing may be carried out in conventional manner, e.g. textile substrates may be dyed, for example, from an aqueous neutral or acidic medium at temperatures from 60° to the boil or at higher temperatures under superatmospheric pressures. Leather and paper may, for example, by dyed as described in German published specifications Nos. 2,306,768 and 1,794,173.

The dyeings obtained on polyacrylonitrile and on acid modified polyamide and polyester substrates show notable fastness to washing, perspiration, sublimation, ironing, dry cleaning, cross-dyeing and solvents. The dyestuffs themselves show good water solubility, produce even dyeings, and are little affected by iron and salt.

The dyestuffs are conveniently employed in the form of dyeing preparations, e.g. liquid or solid preparations which may be formed in conventional manner, e.g. grinding or granulating or by dissolution in solvents, optionally with stabilisers or solvent aids, e.g. urea. Such preparations may, for example, be produced as described in French Pat. Nos. 1,572,030 and 1,381,900.

The following Examples, in which all parts and percentages are by weight and all temperatures in degrees Centigrade, illustrate the invention.

EXAMPLE 1

42.7 Parts of 1-(3'-dimethylaminopropyl)-amino-4-(2'',4''-dimethylphenyl)-amino-anthraquinone are dissolved in 400 parts of chlorobenzene at 60° and 14 parts of dimethyl sulphate are added over the course of 2 hours. The resultant dyestuff of formula

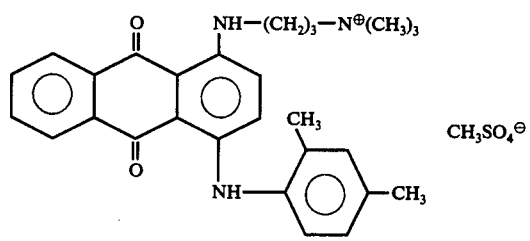

precipitates and is filtered off at 60° and dried at 80° in a vacuum after washing with chlorobenzene. The highly hydrosoluble dyestuff dyes polyacrylonitrile fibres, such as "Orlon", in greenish blue shades. As well as good overall wet fastness properties the dyestuff has notable insensitivity to iron.

APPLICATION EXAMPLE A

20 Parts of the dyestuff described in Example 1 and 80 parts of dextrin are ground for 4 hours in a powder mill. [The same dyestuff mixture may be obtained by making a paste with 100 parts of water and subsequent spray drying.] 1 Part of the preparation thus obtained is made into a paste with 1 part of 40% acetic acid and the paste is covered with 200 parts of demineralised water and boiled for a short time. It is diluted with 7000 parts of demineralised water, 2 parts of glacial acetic acid are added and it is entered into a dye bath at 60° with 100 parts of polyacrylonitrile fabric. The material, if desired, may already have been pre-treated for 10–15 minutes at 60° in a bath consisting of 8000 parts of water and 2 parts of glacial acetic acid.

The bath is heated to 98°-100° over the course of 30 minutes, held at the boil for 1½ hours and the fabric removed and rinsed. A greenish blue dyeing is obtained, which has good light and wet fastness.

In an alternative procedure 10 parts of the dyestuff of Example 1 are dissolved in 60 parts of glacial acetic acid and 30 parts of water. The solution of the dyestuff obtained, which has a dyestuff content of about 10% may be used for dyeing polyacrylonitrile in similar manner to as described above.

APPLICATION EXAMPLE B

20 Parts of the dyestuff of Example 1 are mixed with 80 parts of dextrin in a ball mill for 48 hours; 1 part of the preparation thus obtained is made into a paste with 1 part of 40% acetic acid, the paste is covered with 200 parts of demineralised water and boiled for a short time. Dyeing takes place as follows using this stock solution:

(a) The stock solution is diluted with 7000 parts of demineralised water, 21 parts of calcinated sodium sulphate are added, as well as 14 parts of ammonium sulphate, 14 parts of formic acid and 15 parts of a carrier based on reaction products of ethylene oxide with dichlorophenols, and the resulting dye liquor is entered into a dye bath at 60° with 100 parts of acid modified polyester fabric. The material, if desired, may already have been pre-treated for 10-15 minutes at 60° in a bath consisting of 8000 parts of water and 2 parts of glacial acetic acid. The bath is heated over the course of 30 minutes to 98°-100°, held at the boil for one hour and the fabric removed and rinsed. An even greenish-blue dyeing is obtained with good wet fastness properties.

(b) The stock solution is diluted with 3000 parts of demineralised water, 18 parts of calcined sodium sulphate are added, 6 parts of ammonium sulphate and 6 parts of formic acid, and the resulting dye liquor is entered into a dye bath at 60° with 100 parts of acid modified polyester fabric. The bath is a closed vessel which is heated over the course of 45 minutes to 110°, kept at this temperature with shaking for 1 hour, then cooled over the course of 25 minutes to 60° and the dyed substrate removed and rinsed. An even greenish-blue dyeing is obtained which has good wet fastness properties.

(c) The procedure is the same as for (b), but the closed vessel is heated for 1 hour to 120°.

APPLICATION EXAMPLE C

A stock solution is prepared as in Application Example B, above. The solution is diluted with 7000 parts of demineralised water, 21 parts of calcinated sodium sulphate are added, as well as 14 parts of ammonium sulphate, 14 parts of formic acid and 15 parts of a carrier based on reaction products of ethylene oxide with dichlorophenoles, and the liquor is buffered with an acid buffer solution to a pH-value of 6, and is entered into a dye bath at a liquor ratio of 1:80 with 100 parts of acid modified polyamide fabric. The bath is heated to 98° over the course of 45 minutes, boiled for one hour and the fabric removed, rinsed under flowing water at 70°-80° and subsequently under cold water. The fabric is dried e.g. by spin-drying and is subsequently ironed. A greenish-blue dyeing is obtained which has good fastness properties.

EXAMPLE 2

42.7 Parts of 1-(3'-dimethylaminopropyl)-amino-4-(2",4"-dimethylphenyl)-aminoanthraquinone are stirred with 150 parts of water and 8 parts of 95% sulphuric acid are added. Over the course of 5 hours, 14 parts of propylene oxide are passed into the suspension which is heated to 75°-80°, and the resultant quaternary dyestuff goes into solution. After stirring for 2 hours at 75°-80°, a chromatogram indicates quaternisation to be practically complete. 30 Parts of sodium chloride are then added to the solution at 40° over the course of 30 minutes. In order completely to precipitate the dyestuff, the resultant suspension is stirred for a further 3 hours at 25°-30°. The deposit is then suctioned off, washed with 300 parts of 10% sodium chloride solution and dried in a vacuum drying chamber.

EXAMPLE 3

42.7 Parts of 1-(3'-dimethylaminopropyl)-amino-4-(2",4"-dimethylphenyl)-aminoanthraquinone are dissolved in 400 parts of toluene at 80°. 11 Parts of hydrogen chloride gas are passed into this with stirring over the course of 3 hours, and the protonised product is precipitated. It is filtered off at 60°, washed out with 200 parts of toluene and vacuum dried at 80°.

EXAMPLE 4

41.8 Parts of 4-(3"-chloropropyl)-amino-1-(2',4'-dimethylphenyl)-aminoanthraquinone are stirred in 400 parts of pyridine for 8 hours at 100°-110° until the chromatogram indicates only a trace of the initial substance in a test of the reaction mixture. The resultant crystal mass is diluted with 200 parts of chlorobenzene and is subsequently filtered off at 60°. After washing out with chlorobenzene until the outflow becomes colourless, the dyestuff is dried in a vacuum at 100°. 4-(3"-chloropropyl)-amino-1-(2',4'-dimethylphenyl)-aminoanthraquinone is produced by reacting 4-(3"-hydroxypropyl)-amino-1-(2',4'-dimethylphenyl)-aminoanthraquinone with thionyl chloride at 60°-70° in chlorobenzene.

EXAMPLE 5

50-2 Parts of N-3-(4'-bromo-anthraquinonyl-1'-amino)-propylpyridinium bromide are stirred at 90°-100° for 8-10 hours in 200 parts of 1-amino-2,5-dimethylbenzene, with the addition of 19 parts of anhydrous potassium acetate and 1 part of copper sulphate. The initial red colouration of the reaction medium alters to violet and then to blue and condensation takes place. When a chromatogram indicates the end of condensation, the reaction product is diluted with 100 parts of 1,2-dichlorobenzene and the precipitated dyestuff is isolated by filtration at 60°. The residue is washed out with 1,2-dichlorobenzene and may be recrystallised from n-butanol for further purification. It is vaccum dried at 100°.

The starting material is obtained by bromination of 1-(3'-bromopropyl)-aminoanthraquinone, e.g. in an aqueous hydrochloric acid suspension, with subsequent reaction of the product obtained with pyridine in known manner.

In the following table are given further dyestuffs of formula I which may be produced in a similar manner to those of the previous examples.

The dyestuffs of Examples 2-19 and 21 give greenish-blue dyeings on polyacrylonitrile, e.g. "Orlon" and on acid modified polyester and nylon fabrics, and the dyestuff of Example 20 gives a reddish-blue dyeing on the same fabrics.

| Ex. No. | Q | K | $R_1$ | $R_2$ | $R_3$ | A |
|---|---|---|---|---|---|---|
| 6 | 3,4-dimethylphenyl | pyridinium | — | — | — | $Cl^\ominus$ |
| 7 | 2,5-dimethylphenyl | $-N^\oplus R_1R_2R_3$ | $-CH_3$ | $-CH_3$ | benzyl | $Cl^\ominus$ |
| 8 | " | " | " | " | $-CH_2CH=CH_2$ | $Cl^\ominus$ |
| 9 | " | " | $-C_2H_5$ | $-C_2H_5$ | $-C_2H_5$ | $C_2H_5SO_4^\ominus$ |
| 10 | 2,4-dimethylphenyl | " | $-CH_3$ | $-CH_3$ | $-CH_2CH(OH)CH_3$ | $CH_3COO^\ominus$ |
| 11 | " | " | " | " | $-C_2H_4OH$ | $Cl^\ominus$ |
| 12 | " | " | " | " | $-C_2H_4CONH_2$ | $Cl^\ominus$ |
| 13 | " | " | $-C_2H_5$ | $-C_2H_5$ | $-CH_3$ | $CH_3SO_4^\ominus$ |
| 14 | " | " | $-CH_3$ | $-CH_3$ | $-CH_3$ | p-toluenesulphonate |
| 15 | 3,4-dimethylphenyl | $-N^\oplus R_1R_2R_3$ | $-CH_3$ | $-CH_3$ | $-C_2H_5$ | $C_2H_5-SO_4^\ominus$ |
| 16 | 2,4-dimethylphenyl | " | " | " | $-CH_3$ | $Br^\ominus$ |
| 17 | " | " | " | " | " | $Cl^\ominus$ |
| 18 | " | " | " | " | $-C_2H_4$ | $C_2H_5-SO_4^\ominus$ |
| 19 | " | " | " | " | benzyl | $Cl^\ominus$ |
| 20 | 2,6-dimethylphenyl | " | " | " | $-CH_3$ | $Cl^\ominus$ |
| 21 | 3,5-dimethylphenyl | " | " | " | " | $Cl^\ominus$ |

What is claimed is:

1. A cationic 1,4-diamino anthraquinone dyestuff which is free from sulpho groups and in which the 4-amino group is substituted by a xylyl radical and the 1-amino group is substituted via a propylene bridge by a radical of the formula $-N^\oplus R_1R_2R_3$ in which $R_1$ and $R_2$, independently, are $C_{1-4}$alkyl and
$R_3$ is hydrogen, $C_{1-4}$alkyl, 2-hydroxypropyl or ethyl, allyl, benzyl or 2-aminocarbonyl-ethyl.

2. A compound of claim 1, of formula I,

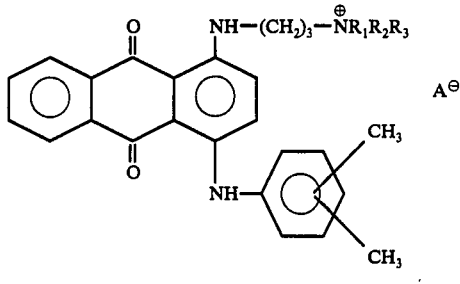

wherein
$R_1$ and $R_2$, independently, signify a $C_{1-4}$alkyl radical, and
$R_3$ is hydrogen, $C_{1-4}$alkyl, 2-hydroxypropyl or -ethyl, allyl, benzyl or 2-aminocarbonylethyl, and
$A^\ominus$ is an anion.

3. A compound of claim 2, wherein the methyl groups in the xylidino radical are in the 2- and 5- or in the 2- and 4-positions.

4. A compound of claim 2, wherein $R_1$ and $R_2$, independently, are methyl or ethyl.

5. A compound of claim 2, wherein $R_3$ is $C_{1-4}$-alkyl or benzyl.

6. A compound of claim 2, wherein the methyl groups in the xylidino radical are in 2- and 5- or in the 2- and 4-positions $R_1$ and $R_2$, independently, are methyl or ethyl and $R_3$ is $C_{1-4}$alkyl or benzyl.

7. A compound of claim 6, wherein the methyl groups in the xylidino radical are in the 2- and 4-positions, $R_1$ and $R_2$ are both methyl and $R_3$ is methyl, ethyl or benzyl.

8. A compound of claim 7, wherein $R_3$ is methyl.

9. A compound of claim 7, wherein $R_3$ is ethyl.

10. A compound of claim 7, wherein $R_3$ is benzyl.

11. A compound of claim 6, in which said methyl groups are in the 2- and 4-positions, $R_1$ and $R_2$ are both ethyl and $R_3$ is methyl.

12. A compound of claim 3, wherein said methyl groups are in the 2- and 4-positions, $R_1$ and $R_2$ are both methyl and $R_3$ is hydrogen.